United States Patent
Park et al.

(10) Patent No.: US 8,558,803 B2
(45) Date of Patent: Oct. 15, 2013

(54) INPUT DEVICE FOR PORTABLE TERMINAL AND METHOD THEREOF

(75) Inventors: Sun Young Park, Suwon-si (KR); Seung Woo Shin, Seoul (KR); Hyun Su Hong, Seongnam-si (KR); Woo Jin Jung, Yongin-si (KR); Jung Yeob Oh, Seongnam-si (KR); Myeong Lo Lee, Seoul (KR); Jin Yong Kim, Seoul (KR); Kyung Hwa Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 955 days.

(21) Appl. No.: 12/627,513

(22) Filed: Nov. 30, 2009

(65) Prior Publication Data

US 2010/0134312 A1 Jun. 3, 2010

(30) Foreign Application Priority Data

Nov. 28, 2008 (KR) .................. 10-2008-0119550
Feb. 6, 2009 (KR) .................. 10-2009-0009712

(51) Int. Cl.
*G06F 3/041* (2006.01)

(52) U.S. Cl.
USPC .......................................... 345/173

(58) Field of Classification Search
USPC .................................... 345/156, 173
See application file for complete search history.

(56) References Cited

U.S. PATENT DOCUMENTS

2009/0251407 A1* 10/2009 Flake et al. .................. 345/156
2009/0293012 A1* 11/2009 Alter et al. ................... 715/810

* cited by examiner

*Primary Examiner* — Abbas Abdulselam
*Assistant Examiner* — Shawna Stepp Jones
(74) *Attorney, Agent, or Firm* — H.C. Park & Associates, PLC (57) ABSTRACT

The present invention relates to an input device and method of a portable terminal. The present invention includes generating an input event by a first input mode, generating a second input event by a motion of the portable terminal simultaneously or consecutively with the input event, and controlling operation of an application program according to the user function of the portable terminal in consideration of the first and second input events.

19 Claims, 8 Drawing Sheets

Right griP

<51>

<53>

Left griP

INPUT DEVICE FOR PORTABLE TERMINAL AND METHOD THEREOF

CROSS REFERENCE TO RELATED APPLICATIONS

This application claims priority from and the benefit of Korean Patent Application No. 10-2008-0119550, filed on Nov. 28, 2008, and Korean Patent Application No. 10-2009-0009712, filed on Feb. 6, 2009, which are hereby incorporated by reference for all purposes as if fully set forth herein.

BACKGROUND OF THE INVENTION

1. Field of the Invention

Exemplary embodiments of the present invention relate to an input device and method for a portable terminal to simplify an input means for inputting commands for zoom-in and zoom-out of a portable terminal.

2. Description of the Background

Portable terminals are widely used and can have various functions in addition to transmitting and receiving phone calls. For example, portable terminals may have a MP3 function corresponding to a file playing function, an image collection function corresponding to capturing and storing images, and functions related to executing mobile games or arcade games.

Existing portable terminals may use a touch screen method in which a user may input a signal through a key pad on a touch screen of the portable terminal. However, such a method of generating input signals typically requires a delicate touch or click. For instance, a user may zoom-in or zoom-out of the display screen by tapping or touching the touch screen or by using a finger widening action. If the zoom-in or zoom-out is done by tapping, the screen may move to the right or left direction (panning), which may not be what the user intended on accomplishing. If finger widening is used for zoom-in or zoom-out, the finger widening action may not be sufficiently wide and the action may be difficult to complete using one hand. As portable terminals get smaller, the problems described hereinabove become more serious.

SUMMARY OF THE INVENTION

Exemplary embodiments of the present invention provide an input device and method for simplifying an input means for generating commands for zoom-in or zoom-out of a portable terminal screen.

Exemplary embodiments of the present invention disclose an input device of a portable terminal. The device includes an input unit, a sensor detection unit, a motion recognition unit, a function controller, and a storage unit. The input unit includes at least one of a touch unit, a pressure sensor, and a key pad. The touch unit sets a reference point corresponding to a touch detected on a touch screen. The pressure sensor detects a pressure applied to the portable terminal. The key pad generates a key input event according to a key input. The sensor detection unit detects a sensor signal generated by at least one of tilting, shaking and grabbing of the portable terminal. The motion recognition unit receives a motion signal generated in the portable terminal according to the sensor signal. The function controller executes a first application program according to a user function corresponding to at least one of the detected touch, the detected pressure, the key input event, and the motion signal. The storage unit stores the first application program.

Exemplary embodiments of the present invention disclose an input method of a portable terminal. The method includes generating a first input event, and generating a second input event corresponding to a motion of the portable terminal, the second input event being generated simultaneously or consecutively with the first input event. The method includes executing a first application program according to a user function of the portable terminal, the first input event, and the second input event.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A portable terminal according to exemplary embodiments of the present invention may recognize a complex user operation and may support related functions. If an input event is generated by a first input mode and a second input event is generated by a movement of a portable terminal along with the input event, an application program can be controlled according to the user function of a portable terminal. The first input event may include at least one of a touch event according to a touch displayed on a touch screen, a key input event by a key pad input and a pressure event generated by a pressure sensor of the portable terminal. The second input event may include an operation signal corresponding to at least one of tilting, shaking, grabbing and tapping of the portable terminal. For example, the portable terminal may collect various input signals including an input signal from a touch unit including a touch sensor, an input signal generated from a key pad or a pressure sensor, an input signal generated by applying pressure to the portable terminal, an input signal generated by movements of the portable terminal such as shaking or snapping, an input signal generated by tilting of the portable terminal, and an input signal generated by a tapping on the body of the portable terminal. The portable terminal may execute a application program of the portable terminal. To this end, the portable terminal can generate input signals using to the above-stated methods and devices including, for example, various sensors, such as a key pad and touch sensor, a pressure sensor, an acceleration sensor, a magnetic sensor, and a gyro sensor. The portable terminal can also perform the function control of an application program being executed according to generated input signals. Thus, the user of a portable terminal can generate necessary input signals through easy operations for the user.

Hereinafter, exemplary embodiments of the present invention are described in detail with reference to the accompanying drawings.

Figure 1:
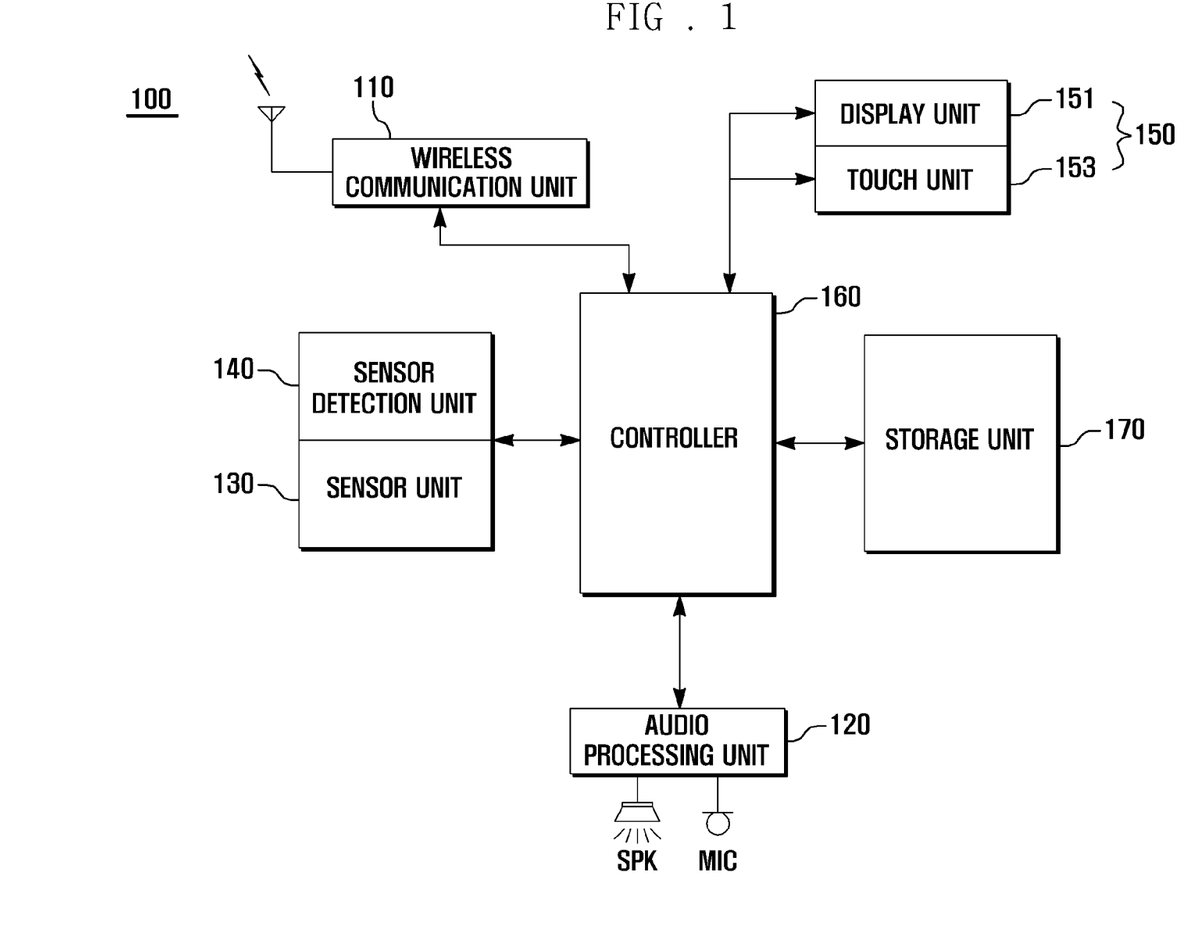
FIG. 1 is a block diagram illustrating a configuration of a portable terminal according to exemplary embodiments of the present invention.

FIG. 1 is a block diagram illustrating a configuration of a portable terminal according to exemplary embodiments of the present invention.

Referring to FIG. 1, the portable terminal 100 may include a wireless communication unit 110, an audio processing unit 120, a sensor unit 130, a sensor detection unit 140, a touch screen 150 including a display unit 151 and a touch unit 153, a storage unit 170, and a controller 160.

The portable terminal 100 may perform zoom-in or zoom-out commands in the process of executing an application program that requires a zoom-in or zoom-out function according to the user's request. The portable terminal 100 may support a direction function to execute an application program, and a content arrangement function to arrange content on the display unit 151. The portable terminal 100 may generate corresponding input signals based on input motion operations, and may then apply the generated input signals to the function being executed. Hereinafter, a configuration of the portable terminal 100 is explained in more detail.

The wireless communication unit 110 may transmit and receive voice signals for implementing a phone call function and data for data communication according to control of the controller 160. For transmission and reception of signals, the wireless communication unit 110 may include a wireless frequency transmission unit which may upconvert the frequency of a signal to be transmitted and amplify the signal to be transmitted, and a wireless frequency reception unit which may low-noise-amplify a received signal and downconvert the frequency of the received signal. The wireless communication unit 110 may form a communication channel with another portable terminal, and may transmit and receive audio or video signals according to the communication channel.

The audio processing unit 120 may include a speaker (SPK) for playing audio data transmitted and received during a phone call and a microphone (MIC) for collecting the user's voice or other audio signals received during a phone call. The audio processing unit 120 can sound an alarm for a zoom-in or zoom-out operation using, for example, a zoom operation sound. The portable terminal 100 may further include a vibration module to perform a vibration alarm. The vibration alarm can substitute the zoom operation sound. If the portable terminal 100 is touched and shaken consecutively and/or simultaneously, the audio processing unit 120 can output an alarm while performing other application programs such as execution of a menu screen or a message writing function. The touching and shaking may occur in any order. The portable terminal 100 may store the alarm sound and/or may link the alarm sound to an application program corresponding to a certain complex signal.

The sensor unit 130 may include various sensors. Examples of the various sensors include an acceleration sensor, a gyro sensor, a magnetic sensor, and a piezoelectric sensor. Such various sensors may operate based on power supplied according to the control of the controller 160, and may generate signals according to movement of the portable terminal 100. The sensor unit 130 can transmit signals generated by various sensors to the sensor detection unit 140.

The sensor detection unit 140 can check signals generated in the sensor unit 130 by monitoring the sensor unit 130. Specifically, the sensor detection unit 140 may distinguish tilting, shaking, snapping, and/or grabbing of a portable terminal 100 based on sensor signals generated by an acceleration sensor or a gyro sensor, and may transmit the signal corresponding to the motion, to the controller 160. The sensor detection unit 140 may analyze motions input from the sensor unit 130. For example, if a portable terminal 100 is tilted forward/backward or is shaken, the sensor detection unit 140 may analyze the amplitude, change in the amplitude, and/or duration of cycle of the movement, and may determine whether the current portable terminal 100 is performing the tilting, shaking, and/or snapping. For example, if a user tilts a portable terminal 100 right, left, forward, backward or in any other direction, the sensor unit 130 may generate a frequency according to the tilting, shaking, and/or snapping. If the sensor signal has a constant amplitude or a certain level of change in the amplitude and the same frequency is generated for a given duration, the sensor detection unit 140 can determine the motion (e.g., tilting, shaking and/or snapping) of the portable terminal 100.

The touch screen 150 may be formed such that a touch unit 153 may be arranged at one side of a display unit 151 of a portable terminal 100. The touch screen 150 may serve as an input unit of a portable terminal 100. The touch screen 150 can receive the input of number or letter information from the user, set images and coordinates values corresponding to input keys and function keys for setting various functions, and may transmit a corresponding touch event to the controller 160. The function keys may include direction keys, side keys, and shortcut keys. The touch screen 150 may generate key signals related to the user setting and function control of the portable terminal 100, and may transmit the generated signals to the controller 160. Particularly, the touch screen 150 can output various key images used for operation of the portable terminal 100 to the display unit 151. After a user's touch is sensed using the touch unit 153, the touched key can be mapping to the key image output on the display unit 151. Also, the touch screen 150 can be formed as a full screen. The touch screen 150 may generate a touch event corresponding to a touch signal for selecting a file stored in the storage unit 170, a drag signal for moving the selected file, and an input signal for editing a file. The touch screen 150 may transmit the generated event to the controller 160. If the user of the touch screen 150 touches certain coordinates, the touch screen 150 may transmit information on the coordinates to the controller

160. The controller 160 may recognize the coordinates as a reference point for executing a zoom-in or zoom out operation, and may execute the zoom-in or zoom-out operation by performing a tilting motion based on the reference point. The touch screen 150 can be substituted by a key pad, which may generate key input signals. The portable terminal 100 may further include the key pad. The portable terminal 100 may also include a pressure sensor for generating input signals. The portable terminal 100 can process a pressure event when pressure is applied to the pressure sensor as an input signal corresponding to a touch event or a key input event. The portable terminal 100 can include at least one of a touch unit 153, a pressure sensor, and a key pad as an input unit.

The display unit 151 may output a screen activated according to the function of the portable terminal 100. For example, the display unit 151 can output the booting screen, idle screen, menu screen, and phone call screen. A liquid crystal display (LCD) may be applied to such a display unit 151, and if the LCD is applied, the display unit 151 may include an LCD controller, a memory to store data, and a LCD display device. The LCD can be implemented using a touch screen method, and the display 151 screen can operate as an input unit. The display unit 151 can output a screen that needs zoom-in or zoom-out according to the user's request. If the reference point is set and a tilting motion signal is input from the sensor detection unit 140, the display unit 151 can output a zoomed-in or zoomed-out screen. The display unit 151 can output a menu activation screen, a message writing activation screen, content (e.g., widget) activation screen, and/or music content activation screen.

The storage unit 170 may store user data and an application program for performing operations and functions. The storage unit 170 may also store a touch User Interface (UI) operation program for operating a touch screen 150, and an operation program for recognizing tilting motion of the portable terminal 100. Further, the storage unit 170 can perform a buffering function of temporarily storing sensor signals collected according to operation of the portable terminal 100. The storage unit 170 may include a program area and a data area.

The program area may store an OS (Operating System) for booting a portable terminal 100, a touch UI operation program, an application program for supporting the sensor unit 130 and the sensor detection unit 140, and an application program for other optional functions of the portable terminal 100, such as a voice playing function, an image display, or video playing function. The program area can store an application program for operating each sensor in the sensor unit 130 and an operation program for recognizing signals input from the sensor unit 130 as given set tilting operation signals.

The data area may be an area where data generated by use of the portable terminal 100 is stored. The data area can store user data, which is related with functions that need a zoom function, such as photographs, images, E-book content and information corresponding to user data. Also, the data area may store a screen image corresponding to a screen associated with an application program being executed. The screen may include a list of application programs, and the screen may be zoomed in or out of according to a tilting motion of the portable terminal 100. The list of the application programs may include an image viewer, a document viewer and a photograph editor. Such a list may be stored in the function table. The function table may be a table which defines operation of the application program that is being executed according to generation of complex signals generated in the portable terminal 100. That is, the function table stores commands which define how each application program included in the application program list should be operated according to motion signals detected by the sensor detection unit 140. Further, the data area can store alarm sounds to be output by the audio processing unit 120.

The controller 160 may control the power supply of the portable terminal 100, activate/deactivate each component in the portable terminal 100, and may control the flow of signals transmitted and received between components. The controller 160 can control a zoom-in or zoom-out operation of an application program screen that is being executed according to a tilting motion signal. The tilting motion signal may be generated according to the user's operation of the portable terminal 100.

Figure 2:
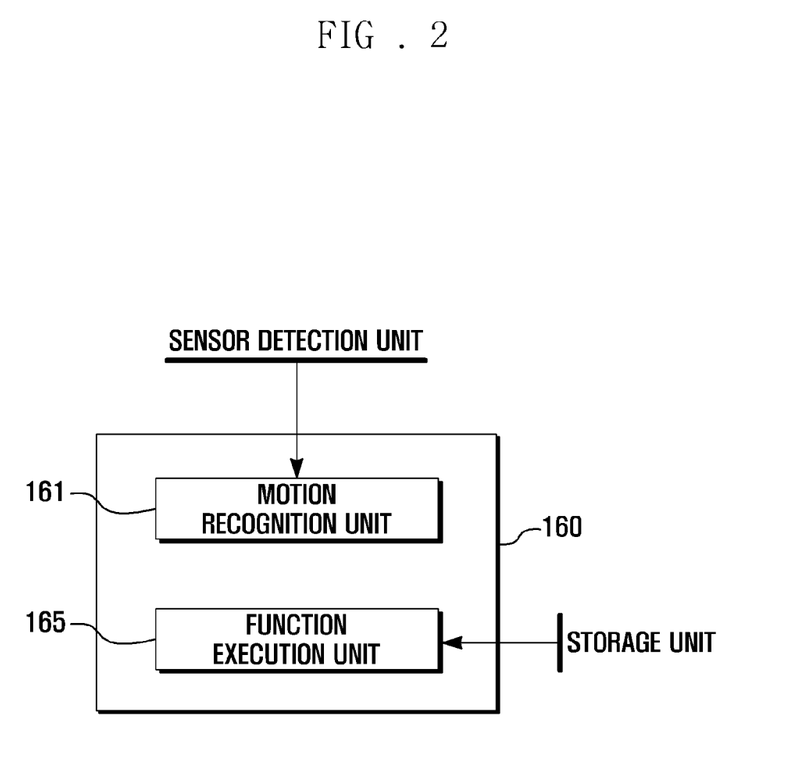
FIG. 2 is a block diagram illustrating a configuration of a controller according to exemplary embodiments of the present invention.

As illustrated in FIG. 2, the controller 160 can include a motion recognition unit 161 and a function execution unit 165. The motion recognition unit 161 may determine whether the portable terminal 100 is appropriately tilted, shaken, snapped, and/or grabbed based on sensor signals transmitted from the sensor detection unit 140. The motion recognition unit 161 may collect sensor signals transmitted from the sensor detection unit 140, determine whether the collected sensor signals are forward tilting or backward tilting, and transmit the corresponding motion signal to the function execution unit 165. The motion recognition unit 161 may also check the sensor signal transmitted from the sensor detection unit 140, determine whether the signal corresponds to shaking, snapping, or grabbing, and transmit the corresponding motion signal to the function execution unit 165. Specifically, the motion recognition unit 161 can determine whether the change in amplitude and/or frequency of the sensing signal transmitted by the sensor detection unit 140 satisfies preset frequency (cycle) and amplitude values. The motion recognition unit 161 can determine whether the direction, intensity, and duration of pressure according to the sensed motion satisfy the preset conditions. For example, the motion recognition unit 161 may detect the frequency parameter value according to the tilting, shaking and snapping motion, and may set the frequency parameter value corresponding to the stoppage state after completion of the motion. Here, the motion recognition unit 161 can set an error rate for a maintenance time of stoppage state to more than 1 second. The error rate can be set according to a determined value, a designer's choice, or the user's choice. Further, it is desirable for the motion recognition unit 161 to have the setting of forward tilting or backward tilting depending on a direction of an axis of the portable terminal 100. The motion recognition unit 161 transmits the motion signal based on the direction of motion to the function execution unit 165. The motion recognition unit 161 determines whether the pressure generated by the motion (e.g., tilting, shaking, grabbing) is more than a determined value. The motion recognition unit 161 may also determine the duration of the pressure. The pressure may be maintained while determining the type (e.g., tilting, shaking, grabbing) of motion signal. The motion recognition unit 161 can differentiate between motions according to the direction, intensity, and duration of the pressure. A motion signal corresponding to the determined motion can then be transmitted to the function execution unit 165.

If a touch on a certain part of the touch screen 150 is detected while a certain application program is executed, the function execution unit 165 receives a tilting motion signal from the motion recognition unit 161, loads the stored application program list and the function table to the storage unit 170, and checks whether the currently executed application program is included in the application program list and the function table. If the currently executed application program is included in the application program list and the function table, the function execution unit 165 may perform a zoom-in or zoom-out operation according to the tilting operation using the detected touched part as the reference point. If the transmitted tilting motion signals are generated consecutively, the function execution unit 165 can continually perform one of zoom-in operation and zoom-out operation. If the tilting motion signals are generated consecutively and the zoom operation is performed continually, after the function according to the first tilting signal is performed, an alarm may be sounded to indicate consecutive performance of the function. That is, the function execution unit 165 can sound an alarm used for zoom operation or can generate a vibration alarm. Also, the function execution unit 165 can perform different operations for the same function according to the tilting signal transmitted by the motion recognition unit 161. Accordingly, the function execution unit 165 can consecutively control the zoom function according to a first tilting operation signal having a first amplitude or first amplitude change within a first given time and a second tilting operation signal having a second amplitude or second amplitude change within a second given time. The function execution unit 165 can check generation of a touch event, a tilting motion signal, a snapping motion single, and a grabbing motion signal, and can determine whether the generated signal is to be applied to the application program being executed. If the motion signals are defined in a function table, the function execution unit 165 can control operation of the application program by applying the touch event and the operation signal to the application program. The function execution unit 165 can check whether the currently executed application program has a definition for operation according to complex signals, by loading the function table when a touch event is generated. If a definition exists, the function execution unit 165 can wait for operation signals after the touch event for a given time. Further, after a motion signal is generated, if there is a definition for the application of the complex signals according to generation of the touch event, the function execution unit 165 can control the currently executed application program according to the corresponding definition. The function execution unit 165 can control the operation of the application program of the portable terminal 100 according to generation of a touch event, motion signals, a key input event, or a pressure event. The function execution unit 165 can control the operation of the application program according to generation of at least one of a touch event, a key input event, a pressure event, and the motion signal generated with each event at the same time or consecutively.

As stated above, an input device of a portable terminal 100 can support other types of signals that may be input to perform a zoom-in and zoom-out operation after a touch is recognized on the displayed screen. Also, an input device of a portable terminal 100 can determine a touch event (e.g., shaking motion signal, snapping motion signal and grabbing motion signal) generated by a touch on a certain portion of the display unit as one input signal.

Figure 3:
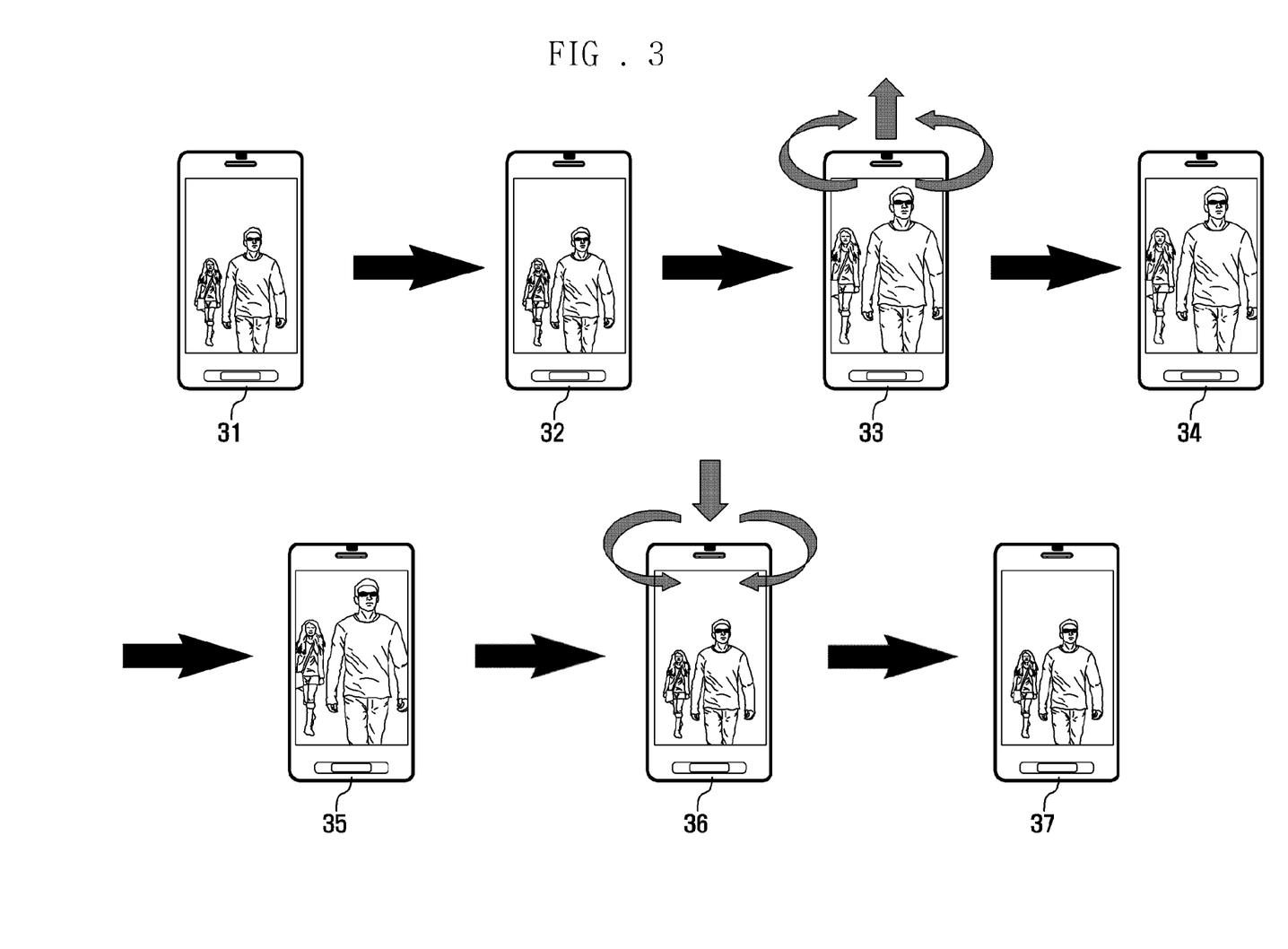
FIG. 3 illustrates a zoom-in or zoom-out screen according to exemplary embodiments of the present invention.

FIG. 3 illustrates a zoom-in or zoom-out screen according to exemplary embodiments of the present invention.

Referring to FIG. 3, if a user activates an image viewer function among the menus, the display unit 151 can output a screen where the image viewer has been activated as shown in screen 31. If the screen is displayed, the user of the portable terminal 100 can set the reference point by touching the touch screen as shown in screen 32. After that, if the user tilts the portable terminal 100 forward by a first tilting level while touching the portable terminal 100, the screen is zoomed in according to the first tilted level based on the reference point as shown in screen 33. If the user stops the touch or tilting motion of the portable terminal 100 and levels the portable terminal 100, the zoom-in operation of the screen is stopped, and the already zoom-in screen is displayed on the display unit 151 as shown in screen 34. If the user of the portable terminal 100 tilts the portable terminal 100 backward by a second tilting level while touching the portable terminal 100 based on the reference point as shown in screen 35, the screen is zoomed out gradually according to the second tilted level based on the reference point. If the user stops the touch or tilting motion of the portable terminal 100 and levels the portable terminal 100, the zoom-out operation of the screen is stopped, and the zoomed-out screen is displayed on the display unit 151 as shown in screen 37. Further, the zoom operation alarm may be output during zoom-in or zoom-out operation. An alarm or alarm vibration may also be output if the zoom-in or zoom-out reaches a limit.

Hereinafter, an input method of a portable terminal according to exemplary embodiments of the present invention will be described.

Figure 4:
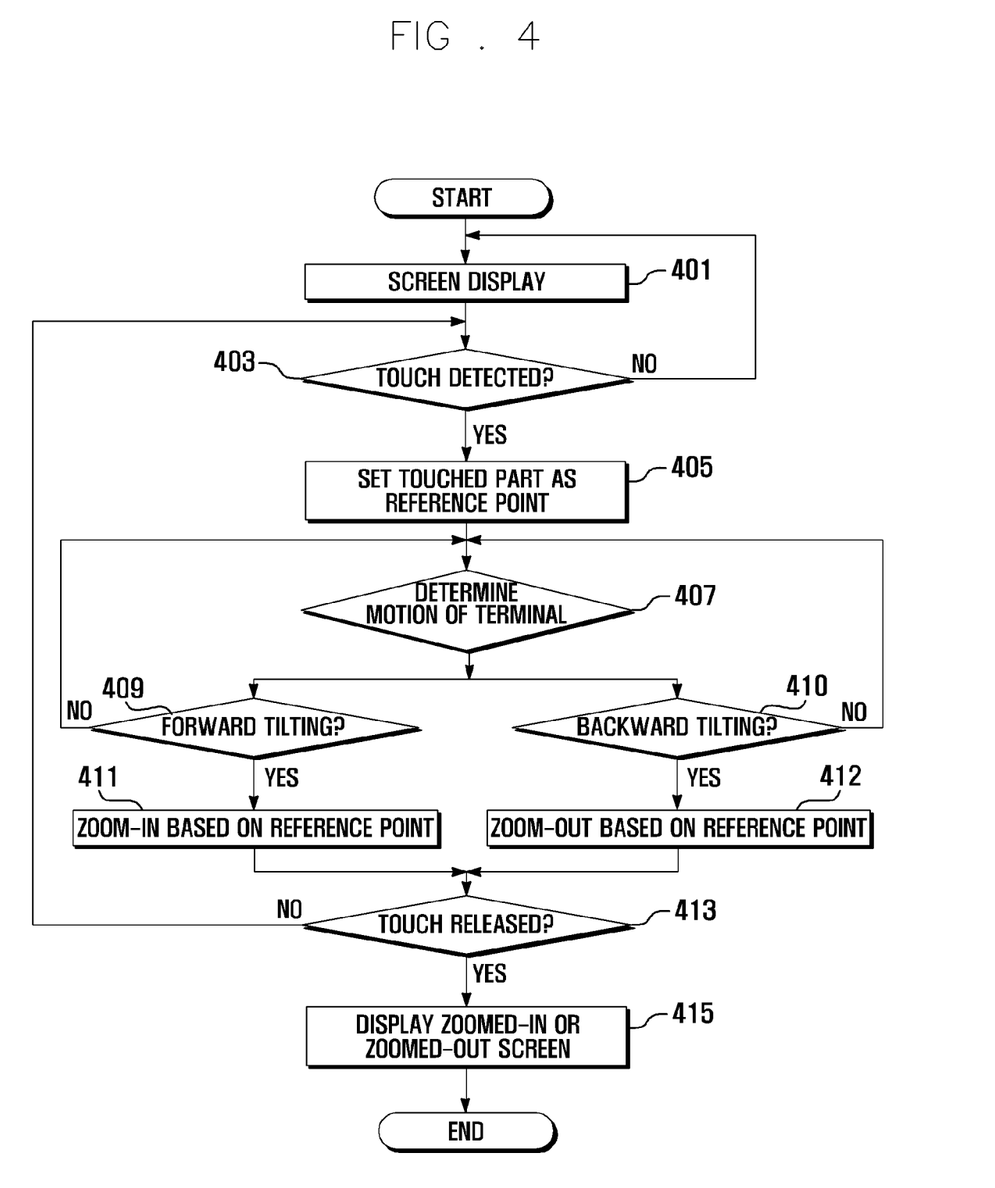
FIG. 4 is a flowchart illustrating an input method of a portable terminal according to exemplary embodiments of the present invention.

FIG. 4 is a flowchart illustrating an input method of a portable terminal according to exemplary embodiments of the present invention.

First, a controller 160 controls the display unit 151 to display a screen capable of implementing a zoom-in or zoom-out operation upon selection by a user (401).

After the screen is displayed, the controller 160 may detect a touch by the user on the touch unit 153 (403), and may set a point where the user touched the touch unit 150 as the reference point (405).

Then, the controller 160 may determine the motion of the portable terminal 100 by checking the motion signal. The determined motion may include information about the direction and angle of the portable terminal 100 movement and a physical pressure the portable terminal 100 may be held with during the motion (407). If a forward tilting motion signal is generated (409), the controller 160 may gradually zoom in the displayed screen according to the tilted level based on the set reference point (411). If a backward tilting motion signal is generated at step 409, the controller 160 may gradually zoom out the screen according to the tilted level based on the set reference point (412).

At step 411 or 412, an alarm sound or alarm vibration for zoom operation (zoom-in/zoom-out) may be output.

Then, if the release of the user's touch is detected (413), the controller 160 may stop the zoom-in or zoom-out operation, and display the zoomed-in or zoomed-out screen on the display unit 151 (415).

In the above-description, the movement of the tilting motion has been only described as forward or backward, but various movements can be used and differentiated. Thus, at step 409 and 410, scrolling or panning may be performed according to the direction of the tilting motion.

Figure 5:
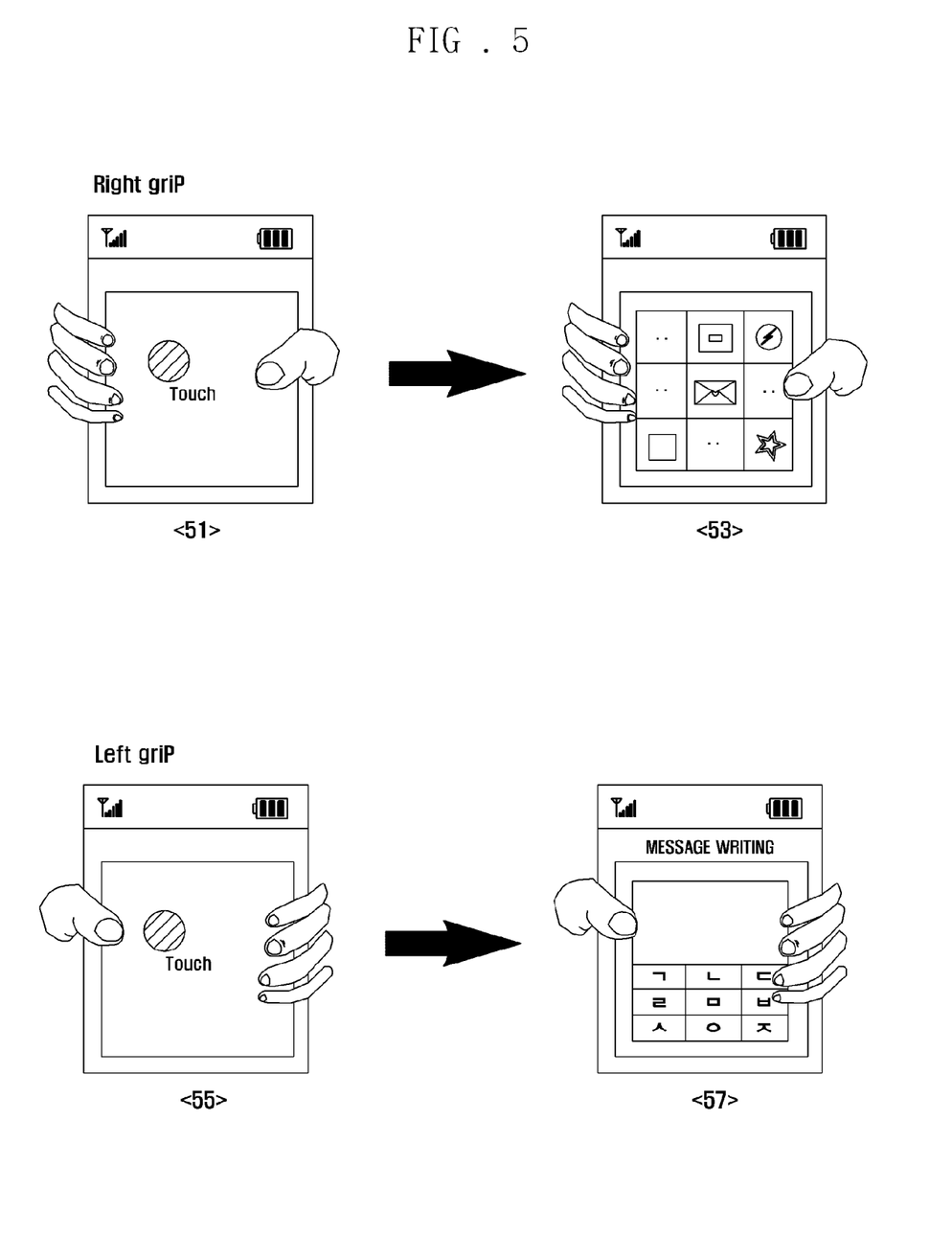
FIG. 5 illustrates an operation of a portable terminal according to a grabbing operation signal and touch event, according to exemplary embodiments of the present invention.

FIG. 5 illustrates the control of a portable terminal 100 according to a grabbing motion signal and a touch event according to exemplary embodiments of the present invention.

Referring to FIG. 5, the portable terminal 100 can complete booting (i.e. starting up) using supplied power and may output a preset idle screen. The portable terminal 100 can load the function table and may control the operation of an application program corresponding to the idle screen. When the idle screen is displayed, the user of the portable terminal can grab the portable terminal 100 with the user's right hand as in screen 51 and can touch a certain portion of the idle screen. The portable terminal 100 can determine whether the right grip of the user is a valid motion. Specifically, the portable terminal can detect the direction, intensity, and duration of the pressure generated by the right grip. Also, the portable terminal 100 can check whether the direction, intensity, and duration of the detected pressure satisfy preset conditions. If the detected values satisfy the preset conditions, the portable terminal 100 can generate a grabbing motion signal. The portable terminal 100 can also generate a touch event using a touch sensor when the grabbing motion signal has been generated. The portable terminal 100 can, in some cases, simultaneously generate a touch event and a grabbing motion signal; in some cases, generate a touch event within a determined time period after generation of the grabbing motion signal; and in some cases, generate a grabbing motion signal within a determined time period after the touch event is generated. For example, if a display unit 151 is touched when the user is grabbing the portable terminal 100, the portable terminal 100 may recognize the generated grabbing motion signal and the touch event according to the complex signals defined by the idle screen application program being executed. Thus, the portable terminal 100 can output a screen defined according to generation of a touch event and a grabbing motion signal. The screen may display a menu screen as in screen 53. The menu screen may be, for example, a camera function and/or a MP3 function corresponding to a file playing function.

According to another example, the user of the portable terminal 100 can grab the portable terminal 100 with a left hand of the user as in screen 55, and can touch the idle screen. The portable terminal can detect the direction, intensity, and pressure of the motion (e.g., grabbing) of the user, and can recognize the left grip. The portable terminal 100 can detect a touch event on the display unit 151. Thus, the portable terminal 100 can control an application program according to the left grip motion signal and the touch event according to the information defined in the function table for a left grip. The portable terminal 100 may then output a display screen, for example, a message writing window, as shown in screen 57. The portable terminal 100 can output a key map for writing a message on the lower side of the message writing window.

The portable terminal 100 can have a piezoelectric sensor for detecting the direction, intensity, and duration of the grabbing motion. The portable terminal 100 can have piezoelectric sensors on several areas of the body of the portable terminal 100 to clearly detect the direction and intensity of the grabbing motion, and can determine the direction and intensity based on the signal values transmitted from corresponding piezoelectric sensors.

As stated above, the portable terminal 100 can detect the direction, intensity, and duration of a grip of the portable terminal 100, can detect a grabbing motion signal, and can control given application programs according to touch events. For example, the portable terminal 100 can control various user functions of the portable terminal 100 such as a camera function, file playing function, message writing function, file search function, and a phone call function. The portable terminal 100 can also detect the grabbing motion signals as various motion signals depending on the direction, so that various input methods can be provided. For example, a touch event may be generated before, after, or at the same time as the grabbing motion. The portable terminal 100 can recognize different input methods for generation of a grabbing motion signal after generation of a touch event, and for generation of a touch event after generation of a grabbing motion signal, may control the application program in a different manner based on the order of the grabbing motion signal and touch event.

The portable terminal 100 can perform different application controls depending on the portion of the display unit 151 where a touch event is generated. Specifically, after the user generates a grabbing motion signal by applying pressure to the body of the portable terminal 100, if an area of the display unit 151 such as an upper central area, a central area, a lower central area, and each edge area of the display unit 151 is touched, the portable terminal 100 can activate application programs and control the application program being executed based on the touched area. The portable terminal 100 can also generate different grabbing motion signals depending on the direction, intensity, and duration of the grabbing motion signal, and can generate different input signals depending on the reference point where the touch event recognized as a complex signal is generated. Thus, the portable terminal 100 can generate various input signals depending on the grabbing motion and the touch event, and can operate application programs differently.

Figure 6:
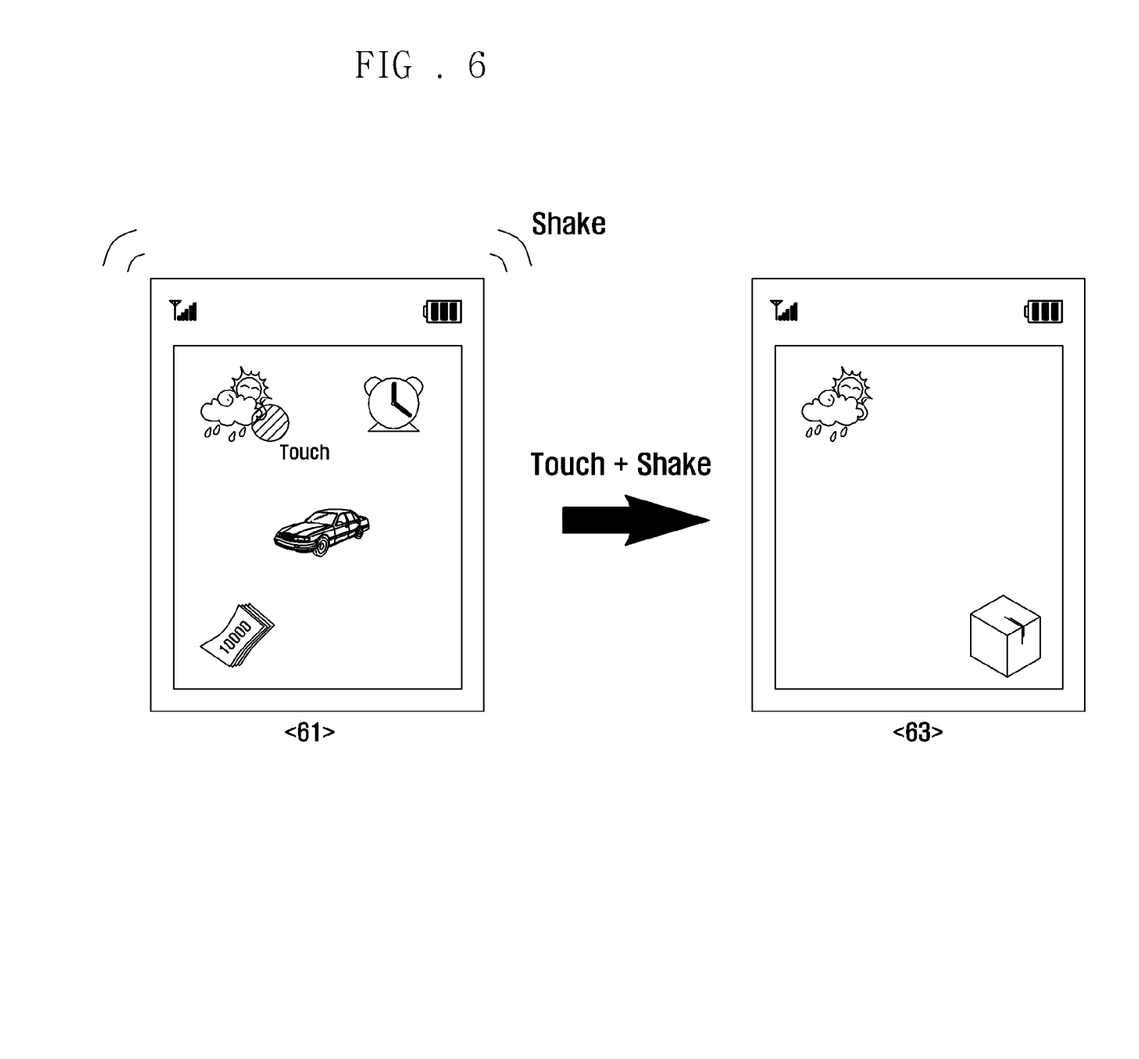
FIG. 6 illustrates an operation of a portable terminal according to a shaking operation signal and touch event, according to exemplary embodiments of the present invention.

FIG. 6 illustrates a control of a portable terminal 100 according to a shaking motion according to exemplary embodiments of the present invention.

Referring to FIG. 6, the portable terminal 100 can display various types of content which may be stored in the storage unit 170, as shown in screen 61. The content displayed in the display unit 151 may be icons representing, for example, a photo file, a music file, and widget icons. Icons displayed on screen 61 may be a watch-shaped icon, a car-shaped icon showing traffic information, and/or a money-shaped icon showing finance-related information such as securities and real estates. Widget icons can be displayed on the idle screen depending on the setting of the portable terminal 100, and can be positioned at one side of the display unit 151. After activating the widget application program, the user can add, remove, or move widget icons providing different information from the display unit 151.

The user of the portable terminal 100 can touch, for example, a weather icon or can shake the portable terminal 100 while touching the icon. The portable terminal 100 can recognize that the weather icon has been selected by detecting the touch event generated on the touched icon. If the user shakes the portable terminal 100 in a certain direction, amplitude, and frequency, the portable terminal 100 can determine whether the direction, amplitude, and frequency satisfy preset conditions. The portable terminal 100 can use an acceleration sensor, a magnetic sensor, and/or a gyro sensor to generate a shaking motion signal corresponding to the direction, amplitude, and frequency.

If the generation of a touch event and a shaking motion signal is detected, the portable terminal 100 can control the application program being executed with reference to the function table. That is, while the portable terminal 100 controls only the weather icon (i.e., the widget icon where a touch event has been generated) at the position of the touch event, other widget icons can be controlled to disappear from the display unit 151, or a box may be displayed on the right bottom side of the display unit 151 to contain the other widget icons. That is, the portable terminal 100 can provide a widget icon arrange function based on the touch event and shaking motion signals by processing other icons except the widget icon on which a touch is detected.

In the foregoing description of FIG. 6, displayed content was referred to as widget icons. However, the displayed content may include other visual elements, such as, for example, photo file icons, music file icons, and/or menu icons.

Figure 7:
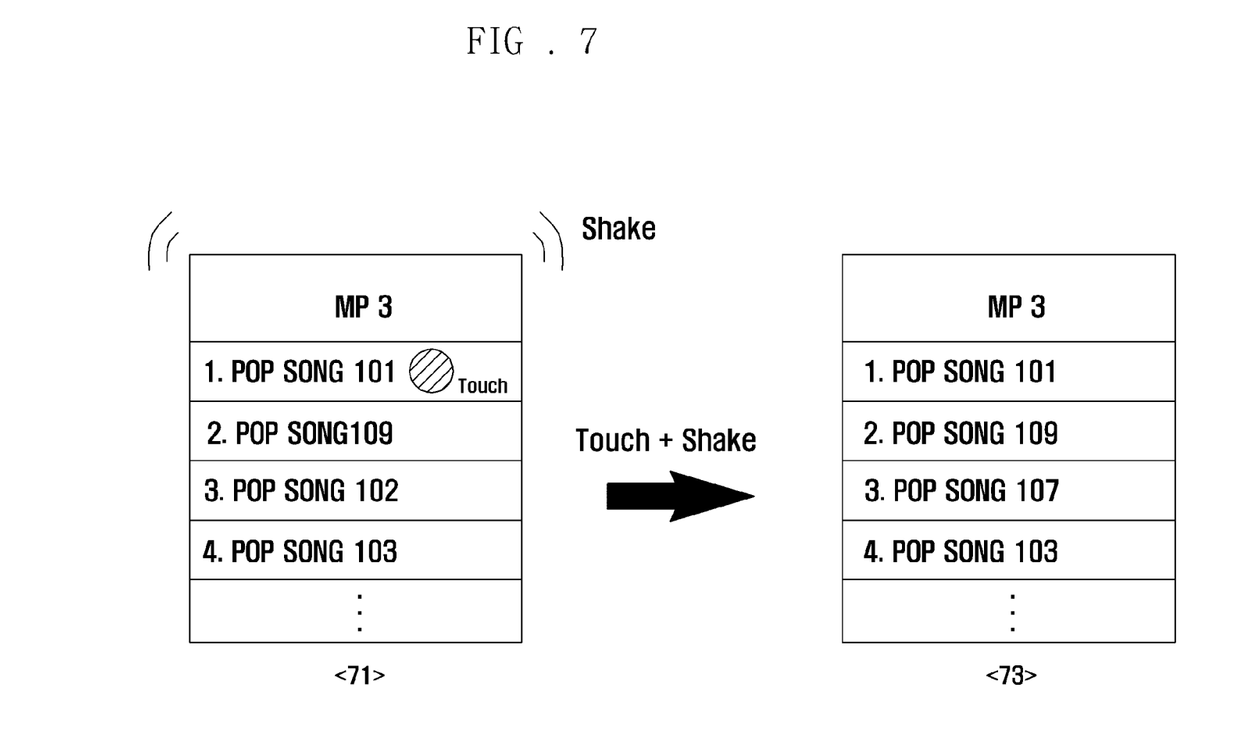
FIG. 7 illustrates MP3 function operation according to exemplary embodiments of the present invention.

In FIG. 7, if a user requests a music player function (i.e., MP3 function) using a menu selection or a key input, the portable terminal 100 can output a screen for supporting the MP3 function, as shown in screen 71. The screen 71 for supporting the MP3 function may include an "MP3" index information area, which provides the types of the application programs being executed, and a list area, which provides a list of music file items stored in portable terminal 100. Each item displayed in the list area may be positioned according to a given order or a random order. The portable terminal 100 can play items displayed on the list area from the top to the bottom in order. The screen 71 for supporting the MP3 function can display an ellipsis on one side of the screen 71 indicating that additional items may be displayed.

If the user of the portable terminal 100 wants to perform a shuffle function to mix items currently displayed on the list area, the user can perform a touch motion as illustrated for certain items. For example, the user can shake the portable terminal 100 to execute the shuffle function. The sensor unit 130 can detect the direction, amplitude, and frequency of the shaking, and the sensor detection unit 140 can output sensor signals corresponding to the shaking of the portable terminal 100. The sensor detection unit 140 can differentiate a snapping motion signal having one amplitude and one cycle or a shaking motion having a number of amplitudes and frequencies by checking the amplitude and the frequency of the shaking.

If a touch event is generated while the MP3 function is executed, the portable terminal 100 can load the function table and can control a function of the MP3, for example, a shuffle function, depending on the shaking motion signal generated after the touch event. That is, the portable terminal 100 can change the order of "pop song 101," "pop song 109," "pop song 102," and "pop song 103" as in screen 71, to "pop song 101," "pop song 109," "pop song 107," and "pop song 103" as in screen 73. Item "pop song 101" may be an item touched by the user. A predetermined rule or a random shuffle function can be applied to the items, except the user-touched item.

As noted above, the portable terminal 100 can differentiate shaking motion signals having several amplitudes and frequencies and snapping motion signals having one amplitude and frequency, and can use different MP3 functions for each motion signal. That is, if a snapping motion signal is generated, the portable terminal 100 can support a shuffle function by mixing only the items displayed on the display unit 151 according to a predetermined rule. If a shaking motion signal is generated, the portable terminal 100 can perform a shuffle function for items displayed on the display unit 151 and all files existing in the same folder stored in the storage unit 170.

The portable terminal 100 may also remove items from the display unit 151 except the items on which a touch has been detected. That is, if the user touches a displayed item and shakes the portable terminal 100, untouched items can be removed from the display unit 151.

A portable terminal 100 can control application programs differently depending on the point touched by the user. For example, if the user shakes the portable terminal 100 after touching an edge of the display unit 151, the portable terminal 100 can shuffle or remove items displayed on the display unit around the edge touched by the user.

Figure 8:
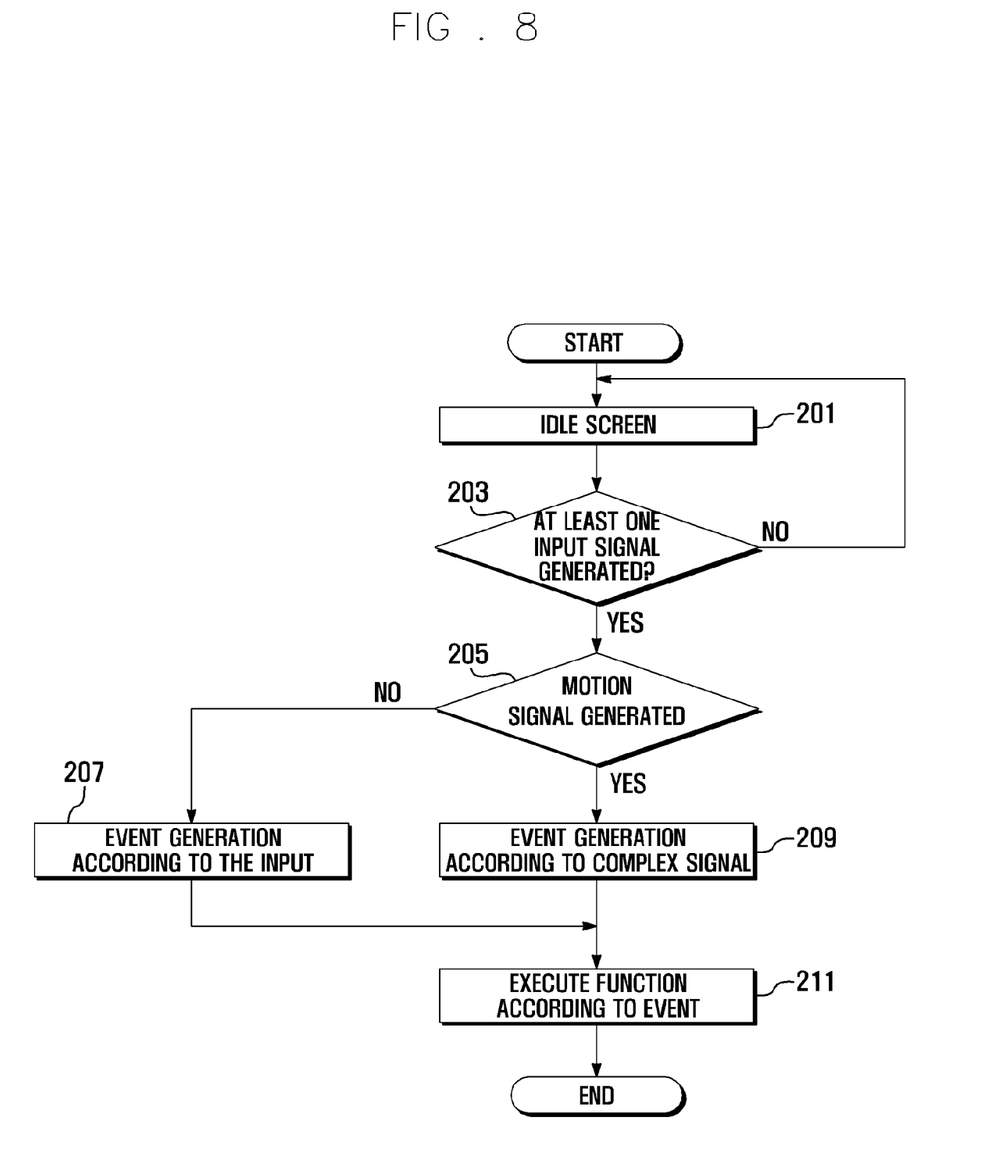
FIG. 8 is a flowchart illustrating a method of operating a portable terminal according to exemplary embodiments of the present invention.

FIG. 8 is a flowchart illustrating a method of operating a portable terminal 100 according to exemplary embodiments of the present invention.

Referring to FIG. 8, an idle screen may be displayed after the portable terminal 100 is started and the controller 160 and other components of the portable terminal 100 are supplied power (201). The controller may check if at least one input signal including a key input event from a key pad, a touch event from a touch unit, a pressure event from a pressure sensor, and other events according to other inputs, has been generated (203). If input signals are not generated at step 203, the idle screen is maintained.

If at least one input signal is generated in step 203, the controller 160 can check if a motion signal has been generated (205). If an input signal is generated at step 203, the controller 160 can load the function table or the application program list stored in the storage unit 170.

A motion signal may include a tilting motion signal, a shaking motion signal, a snapping motion signal, and a grabbing motion signal that can be generated by tilting, shaking, or grabbing. If a motion signal is not generated at step 205, the controller 160 can control the generation of events according to the at least one input generated at step 203 (207). For example, if a key input signal is generated at step 203, the controller can display letters or numbers corresponding to the key signals on the idle screen or can control conversion of the screen displaying the letters or numbers. If a touch event is generated, the controller 160 can activate a key map mapped to the area where the touch event has been generated. Then if the user taps a certain point of a portable terminal 160, an input signal can be generated.

If a motion signal is generated at step 205, the controller 160 may generate events according to complex signals by referring to the function table and the application program list (209). For example, the controller 160 can generate a complex signal according to a touch event and a tilting motion signal, a complex signal according to a touch event and a shaking motion signal, and/or a complex signal according to a touch event and a snapping motion signal.

Thereafter, the controller 160 can execute the application program according to the complex signal (211). For example, if a touch event and a shaking motion signal are generated, the controller 160 can arrange content displayed on the display unit 151 according to a predetermined rule, and a shuffle function if an MP3 application program is being executed.

In the description hereinabove, a motion signal was generated after an input signal was generated. However, a motion signal may also be generated before the input signal. The portable terminal 100 can then execute application programs depending on the order of the input signal and motion signal. The portable terminal 100 can also execute application programs based on complex signals received while other application programs, such as a camera function, a message writing function, and an MP3 function are executed.

Furthermore, in the description hereinabove, the tilting, shaking, and grabbing motions may be done separately, but when a plurality of motions are generated, complex signals can be generated to control application programs. For example, if a touch event is generated and the user grabs the portable terminal 100 in a manner that satisfies preset conditions thereby generating a grabbing motion signal, and tilts or shakes the portable terminal 100, the portable terminal 100 can control an application program by recognizing the generated tilting or shaking motion signal along with other inputs, i.e., the touch event and grabbing motion signals. Accordingly, the process of generating complex signals may include combining various motion signals differently generated depending on the respective touch events.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An input method of a portable terminal, the method comprising:
   generating a first input event;

generating a second input event corresponding to a motion of the portable terminal, the second input event being generated simultaneously or consecutively with the first input event; and executing a first application program according to a user function of the portable terminal corresponding to the first input event and the second input event, wherein executing the first application program comprises:
setting a point corresponding to a touch on a touch screen of the portable terminal as a reference point;
determining a direction of a tilting of the portable terminal; and
setting a size of a screen of the portable terminal based on the reference point and the direction of the tilting.

2. The method of claim 1, wherein generating a first input event comprises at least one of:
generating a touch event corresponding to the touch on the touch screen;
generating a key input event corresponding to an input on a key pad; and
generating a pressure event corresponding to pressure detected by a pressure sensor.

3. The method of claim 2, wherein generating a touch event comprises generating the touch event based on the point where the touch on the touch screen is detected.

4. The method of claim 1, wherein generating a second input event comprises generating a motion signal corresponding to at least one of tilting, shaking, grabbing, and tapping of the portable terminal.

5. The method of claim 4, wherein generating a motion signal comprises at least one of:
generating the motion signal according to the direction and an angle of the tilting;
generating the motion signal according to a direction, an intensity, and a duration of a pressure of the grabbing; and
generating the motion signal according to an amplitude, a frequency, and an amplitude change corresponding to the shaking.

6. The method of claim 1, wherein executing the first application program further comprises:
detecting a release of the touch on the touch screen; and
displaying the screen.

7. The method of claim 6, wherein the direction of the tilting comprises a forward direction, a backward direction, a right direction, or a left direction.

8. The method of claim 7, wherein setting the size of the screen size comprises one of:
displaying a zoomed-in screen if the direction of the tilting is the forward direction;
displaying a zoomed-out screen if the direction of the tilting is the backward direction; and
outputting a zoom operation alarm or a vibration alarm.

9. The method of claim 8, wherein outputting a zoom operation alarm or a vibration alarm comprises outputting, in response to a maximum tilting of the portable terminal, the zoom operation alarm or the vibration alarm.

10. The method of claim 6, further comprising at least one of:
displaying the reference point on the screen; and
removing the reference point in response to detecting the release of the touch.

11. The method of claim 1, further comprising:
generating a complex signal corresponding to the first input event and the second input event, and wherein executing the first application program comprises executing the first application program according to the generated complex signal.

12. The method of claim 11, wherein generating a complex signal comprises at least one of:
generating the complex signal corresponding to a touch signal associated with the touch detected at the point on the touch screen of the portable terminal and a motion signal generated according to the direction and an angle of the tilting of the portable terminal;
generating the complex signal corresponding to a touch signal associated with the touch detected at the point on the touch screen of the portable terminal and a motion signal generated according to a direction, an intensity, and a duration of a pressure associated with grabbing of the portable terminal; and
generating the complex signal corresponding to a touch signal associated with the touch detected at the point on the touch screen of the portable terminal and a motion signal generated according to an amplitude, a frequency, and an amplitude change corresponding to shaking of the portable terminal.

13. The method of claim 1, wherein executing the first application program further comprises at least one of:
executing a second application program based on a direction of a grabbing motion and the reference point where the touch of a user on the portable terminal is detected;
arranging first contents, other than second contents indicated by an input signal, on a display unit;
generating an input signal corresponding to a grabbing of the portable terminal;
generating a motion signal corresponding to shaking of the portable terminal; and
removing second contents from the display unit, and rearranging first contents according to a rule.

14. An input device of a portable terminal, the device comprising:
an input unit comprising at least one of:
a touch unit to set a reference point corresponding to a touch detected on a touch screen;
a pressure sensor to detect a pressure applied to the portable terminal; and
a key pad to generate a key input event according to a key input;
a sensor detection unit to detect a sensor signal generated by at least one of tilting, shaking, and grabbing of the portable terminal;
a motion recognition unit to receive a motion signal generated in the portable terminal according to the sensor signal;
a function controller to execute a first application program according to a user function corresponding to at least one of the detected touch, the detected pressure, the key input event, and the motion signal; and
a storage unit to store the first application program,
wherein the motion recognition unit is configured to detect a first tilting motion signal having a first amplitude or a first amplitude change within a first time period, and a second tilting motion signal having a second amplitude or a second amplitude change within a second time period.

15. The device of claim 14, wherein the function controller is configured to control one of a zoom-in operation and a zoom-out operation based on the reference point according to forward, backward, right, and left tilting motions detected by the motion recognition unit.

16. The device of claim 15, further comprising at least one of:
   a display unit to display the zoomed-in or zoomed-out screen in response to release of the touch on the touch screen;
   an audio processing unit to output at least one of a zoom alarm indicating execution of the zoom-in or zoom-out function and an uppermost limit alarm indicating that the zoom-in or zoom-out function has reached an uppermost limit; and
   a vibration module to output at least one of a vibration alarm indicating execution of the zoom-in or zoom-out function and an uppermost limit vibration alarm indicating that the zoom-in or zoom-out function has reached an uppermost limit.

17. The device of claim 14, wherein the function controller is configured to:
   execute the first application program based on the detected touch, the reference point and the motion signal generated according to a direction and an angle of the tilting of the portable terminal;
   execute the first application program based on the detected touch, the reference point, and the motion signal generated according to a direction, intensity, and pressure duration of the grabbing of the portable terminal;
   execute the first application program based on the detected touch, the reference point, and a motion signal generated according to an amplitude, frequency, and amplitude change corresponding to the shaking of the portable terminal; or
   activate and execute a second application program according to the reference point and a direction of the grabbing of the portable terminal.

18. The device of claim 14, wherein the function controller is configured to arrange first content on the display unit according to a determined rule in response to consecutive or simultaneous generation of an input signal generated by a grabbing motion of the user and a motion signal generated by shaking of the mobile terminal, the first content excluding second content identified by an input signal.

19. The device of claim 14, wherein the function controller is configured to remove a plurality of contents displayed on the display unit, or rearranges, based on a determined rule, first contents other than second contents, the second contents being indicated according to an input signal.

* * * * *